US010909534B2

(12) United States Patent
Cichocki (10) Patent No.: US 10,909,534 B2
(45) Date of Patent: Feb. 2, 2021

(54) CRYPTOCURRENCY WITH VALUE BASED ON ELECTRONIC RESOURCES MADE AVAILABLE TO PEER NODES

(71) Applicant: Pawel Cichocki, Warsaw (PL)

(72) Inventor: Pawel Cichocki, Warsaw (PL)

(73) Assignee: PRORTUS

( * ) Notice: Subject to any disclaimer, the term of this patent is extended or adjusted under 35 U.S.C. 154(b) by 0 days.

(21) Appl. No.: 15/892,324

(22) Filed: Feb. 8, 2018

(65) Prior Publication Data

US 2020/0051076 A1 Feb. 13, 2020

Related U.S. Application Data (60) Provisional application No. 62/456,583, filed on Feb. 8, 2017.

(51) Int. Cl.
*G06Q 20/38* (2012.01)
*G06F 21/53* (2013.01)
*G06Q 20/06* (2012.01)

(52) U.S. Cl.
CPC ........... *G06Q 20/389* (2013.01); *G06F 21/53* (2013.01); *G06Q 20/0658* (2013.01); *G06F 2221/2149* (2013.01); *G06Q 2220/00* (2013.01)

(58) Field of Classification Search
CPC ............. G06Q 20/389; G06Q 20/0658; G06Q 2220/00; G06F 21/53; G06F 2221/2149
USPC ........................................................ 705/75
See application file for complete search history.

(56) References Cited

U.S. PATENT DOCUMENTS

| 2016/0330031 | A1* | 11/2016 | Drego | H04L 9/3239 |
| 2017/0063785 | A1* | 3/2017 | Durniak | H04L 63/0428 |
| 2017/0083910 | A1* | 3/2017 | Kraemer | G06Q 20/065 |
| 2017/0180469 | A1* | 6/2017 | Ford | H04L 67/1008 |

(Continued)

OTHER PUBLICATIONS

"Anonymity of cryptocurrencies," https://wiki.anoncoin.net/Anonymity_of_cryptocurrencies, 6 pages, 2017.

(Continued)

*Primary Examiner* — James D Nigh
(74) *Attorney, Agent, or Firm* — K&L Gates LLP; Jordan A. Kwan (57) ABSTRACT

Methods and systems are presented for a cryptocurrency based on distributed ledger (such as blockchain) technology, where a currency emission mechanism is tied to providing useful electronic resources such as computational power, storage, or connectivity to other nodes of the network, effectively creating a distributed computational cloud or supercomputer. Such resources may be provided in a secure (in case of computation sandboxed) environment in order to provide security for the nodes providing the resource. Stored data chunks may be encrypted in order to prevent the storage nodes from accessing the information. Resources may be provided on a non-exclusive basis, with a certain degree of redundancy to assure the nodes requesting the service about its integrity. The present disclosures allow free trading of electronic resources, and have a cryptocurrency that has its value associated with them, effectively building a supercomputer or a cloud where the nodes are rewarded monetarily for their participation.

20 Claims, 5 Drawing Sheets

(56) References Cited

U.S. PATENT DOCUMENTS

2018/0211332 A1* 7/2018 Kraemer ............ H04L 67/2819

OTHER PUBLICATIONS

Astolfi, Felipe, et al., "I2P—The Invisible Internet Project", 5 pages, 2015.
Babaoglu, Ozalp, et al., "Peer-to-Peer Cloud Computing" University of Bologna, Italy, Department of Computer Science and Engineering, 9 pages, Sep. 22, 2014.
"Bittorrent Protocol Specification v1.0", Wikipedia, https://wiki.theory.org/index.php?title=BitTorrentSpecification, 19 pages, last modified Feb. 2017.
Bolosky, William J., et al., "Feasibility of a Serverless Distributed File System Deployed on an Existing Set of Desktop PCs," ACM SIGMETRICS Performance Evaluation Review, 10 pages, 2000, vol. 28. No. 1.
Depardon, Benjamin, et al., "Analysis of Six Distributed File Systems", Research Report, 45 pages, Feb. 15, 2013.
Dingledine, Roger, et al., "Tor: The Second-Generation Onion Router", Defense Technical Information Center Document, 17 pages, 2004.
"Etherum White Paper", https://github.com/ethereum/wiki/wiki/White-Paper 25 pages, last edited Feb. 2, 2018.
Evans, Nathan, et al., "Efficient and Secure Decentralized Network Size Estimation", International Conference on Research in Networking, 14 pages, May 21, 2012.
Graham, Robert, "Ethereum/TheDAO hack simplified" http://blog.erratasec.com/2016/06/etheriumdao-hack-similfied.html, 6 pages, Jun. 18, 2016.
"I2P: A Scalable Framework for Anonymous Communication", https://geti2p.net/en/docs/how/tech-intro, 42 pages, date unknown.
Kearns, Jeff, "Greenspan Says Bitcoin a Bubble Without Intrinsic Currency Value", http://www.bloomberg.com/news/articles/2013-12-04/greenspan-says-bitcoin-a-bubble-without-intrinsic-currency-value, 4 pages, Dec. 4, 2013.
King, Sunny, et al., "Ppcoin: Peer-to-peer cryptocurrency with proof-of-stake", peercoin.net, 6 pages, Aug. 19, 2012.
Mane, Sandeep, et al., "Network Size Estimation in a Peer-to-Peer Network", Department of Computer Science and Engineering, University of Minnesota, www.cs.umn.edu, Sep. 15, 2005, 11 pages.
Maymounkov, Peter, et al., "Kademlia: A Peer-to-peer Information System Based on the XOR Metric", 1st International Workshop on Peer-to-Peer Systems, 13 pages, Mar. 7, 2002.
Nakamoto, Satoshi, "Bitcoin: A Peer-to-Peer Electronic Cash System", available http://bitcoin.org/bitcoin.pdf, 9 pages, 2008.
"Nxt Whitepaper—Core technologies", http://wiki.nxtcrypto.org/wiki/Whitepaper:Nxt#Core_technologies, 20 pages, last modified Feb. 7, 2016.
Vaskin, Pavel, "BlackCoin's Proof-of-Stake Protocol v2", http://blackcoin.co/blackcoin-pos-protocol-v2-whitepaper.pdf retrieved, 2 pages, date unknown.

* cited by examiner

CRYPTOCURRENCY WITH VALUE BASED ON ELECTRONIC RESOURCES MADE AVAILABLE TO PEER NODES

CROSS REFERENCE TO RELATED APPLICATION

This application claims the benefit of U.S. Provisional Application 62/456,583, filed Feb. 8, 2017, and titled, "CRYPTO-CURRENCY WITH VALUE BASED ON ELECTRONIC RESOURCES MADE AVAILABLE TO PEER NODES," the disclosure of which is incorporated herein by reference in its entirety and for all purposes.

TECHNICAL FIELD

The subject matter disclosed is in the technical fields of computer science and financial technology. More particularly, the present subject matter is in the fields of distributed computing, cloud computing, and cryptocurrencies.

BACKGROUND

An increasing number of cryptocurrencies have emerged based on distributed ledger technology, such as the blockchain technology as proposed by Satoshi Nakamoto. While novel for their decentralized properties and use of the blockchain ledger, a number of flaws still remain in their designs. Most of them are purely speculative, in that the value associated with them is not tied to any physical good or service. The cryptocurrencies which incorporate the proof-of-work concept require the peer-to-peer network they live on to perform a significant amount of computation. Such computation is only used to secure the validated transactions by securing the network against sybil attacks and has no other practical application. It is desirable to implement a cryptocurrency based on distributed ledger technology that solves one or more of these problems.

BRIEF SUMMARY

In some embodiments, a network protocol for generating cryptocurrency in a network of nodes based in distributed ledger technology is presented.

In some embodiments, the method may include: transmitting, by a commissioning node, a request to perform calculations, the request to perform the calculations comprising an indication to remit an amount of cryptocurrency upon completion of the calculations; receiving, by a distributing node, the request to perform the calculations; and transmitting, by the distributing node, to a plurality of work nodes, the request to perform the calculations. For each of the plurality of work nodes, the method may further include: receiving the request to perform the calculations; determining whether said work node of the plurality of work nodes is allowed to perform the calculations; determining whether said work node of the plurality of work nodes has computing resources sufficient to execute the request to perform the calculations; and transmitting a readiness reply to the distributing node. The method may further include: transmitting, by the distributing node, to the commissioning node, each of the readiness replies associated with each of the plurality of work nodes; transmitting, by the commissioning node, to the distributing node, and in response to the readiness replies, a calculation chunk associated with the request to perform the calculations, the calculation chunk comprising: instructions on how to perform the calculations, and data that the calculations are to be performed on. The method may further include: transmitting, by the distributing node, to each of the plurality of work nodes indicating a readiness to perform the calculations, a copy of the calculation chunk; for each of the plurality of work nodes receiving a copy of the calculation chunk: conducting calculations on the data in accordance with the instructions on how to perform the calculations; generating a calculation result; and transmitting, the calculation result to the distributing node; transmitting, by the distributing node, to the commissioning node, each of the calculation results; and accepting the calculation results by the commissioning node. After accepting the calculation results, each of the plurality of work nodes that transmitted the calculation results receives a fraction of cryptocurrency associated with the amount of cryptocurrency remitted by the commissioning node.

In some embodiments of the method, the distributing node is chosen randomly and anonymously from the commissioning node, and each of the plurality of work nodes is chosen randomly and anonymously from the distributing node.

In some embodiments of the method, the commissioning node does not know at least some of the identities of any of the plurality of work nodes at least until the request to perform the calculations is completed.

In some embodiments of the method, at least some of the transmissions between the commissioning node, the distributing node, and the plurality of work nodes are recorded in a distributed blockchain ledger.

In some embodiments, a method of a computerized distributing node adhering to a network protocol for causing cryptocurrency to be generated in a network of computerized nodes based in distributed ledger technology is presented. The method may include: receiving, from a commissioning node within the network, a request to perform calculations, the request to perform the calculations comprising an indication to remit an amount of cryptocurrency upon completion of the calculations; transmitting, to a plurality of work nodes within the network, the request to perform the calculations; receiving, from each of the plurality of work nodes, a readiness reply indicating whether said work node is allowed to perform the calculations and said work node has computing resources sufficient to execute the request to perform the calculations; transmitting, to the commissioning node, each of the readiness replies associated with each of the plurality of work nodes; receiving, from the commissioning node, and in response to the transmitted readiness replies, a calculation chunk associated with the request to perform the calculations. The calculation chunk may include: instructions on how to perform the calculations, and data that the calculations are to be performed on. The method may further include: transmitting, to each of the plurality of work nodes indicating a readiness to perform the calculations, a copy of the calculation chunk; receiving, from each of the work nodes indicating the readiness to perform the calculations, a calculation result based on said work node conducting calculations on the data in accordance with the instructions on how to perform the calculations; transmitting, to the commissioning node, each of the calculation results; and receiving an indication that the calculation results have been accepted by the commissioning node. The distribution node receives a fraction of cryptocurrency associated with the amount of cryptocurrency remitted by the commissioning node after the calculation results have been accepted by the commissioning node.

In some embodiments, the method further includes: comparing, by the distribution node, each of the calculation results received from each of the work nodes; determining that at least one of the calculation results is different than another calculation result; and initiating a triage process to reconcile the different calculation results. In some embodiments, the method further includes: determining that a calculation result was computed in error using the triage process; and penalizing the work node that produced the errant calculation result by deducting an amount of cryptocurrency from the penalized work node.

In some embodiments, each of the commissioning node, the distribution node, and the work nodes includes: a routing table comprising address information to at least some other nodes in the network; information to access a copy of a distributed blockchain ledger; and a secured computational sandbox configured to partition off a finite amount of memory and processing power of a computer from other regions of the computer, such that data within the sandbox is not allowed to interact with the rest of the computer outside the sandbox.

In some embodiments of the method, the distribution node is a first distribution node, and the method further comprises: transmitting, by the first distribution node, to a second distribution node, the request to perform the calculations, wherein the second distribution node is configured to transmit the request to perform the calculations to a second plurality of work nodes that the first distribution node is not in direct communication with; receiving, from the second distribution node, a second set of readiness replies from the second plurality of work nodes, indicating for each work node in the second plurality, whether said work node is allowed to perform the calculations and said work node has computing resources sufficient to execute the request to perform the calculations; and transmitting, to the commissioning node, each of the second set of readiness replies associated with each of the second plurality of work nodes.

In some embodiments, a method of a computerized commissioning node adhering to a network protocol for causing cryptocurrency to be generated in a network of computerized nodes based in distributed ledger technology is presented. The method may include: transmitting, to a distribution node within the network, a request to perform calculations, the request to perform the calculations comprising an indication to remit an amount of cryptocurrency upon completion of the calculations; receiving, from the distribution node, a plurality of readiness replies each associated with each of a plurality of work nodes, wherein each readiness reply indicates whether said associated work node is allowed to perform the calculations and said associated work node has computing resources sufficient to execute the request to perform the calculations; transmitting, to the distribution node, and in response to the received readiness replies, a calculation chunk associated with the request to perform the calculations. The calculation chunk may include: instructions on how to perform the calculations, and data that the calculations are to be performed on. The method may further include: receiving, from the distribution node, a plurality of calculation results from each of the work nodes that indicated a readiness to perform the calculations, wherein each of the calculation results are based on said work node conducting calculations on the data in accordance with the instructions on how to perform the calculations; determining whether the received calculation results are valid; transmitting an acceptance that the calculation results are valid; and remitting the amount of cryptocurrency in response to the valid calculation results.

BRIEF DESCRIPTION OF THE DRAWINGS

Some embodiments are illustrated by way of example and not limitation in the figures of the accompanying drawings.

DETAILED DESCRIPTION

Example methods, apparatuses, and systems (e.g., machines) are presented for a cryptocurrency based on distributed ledger technology, such as blockchain technology, that ties valued goods or services to the generation of the currency itself.

As previously mentioned, cryptocurrencies based on the blockchain technology currently include a number of flaws in their designs. Most of them are purely speculative, in that the value associated with them is not tied to any physical good or service. The cryptocurrencies which incorporate the proof-of-work concept require the peer-to-peer network they live on to perform a significant amount of computation. Such computations are only used to secure the validated transactions by defending the network against sybil attacks, and have no other practical application.

However, this computational power could be used for something useful. Nodes of the peer-to-peer network could provide resources such as computational power or storage to other nodes in exchange for the cryptocurrency which could also affect the currency emission mechanism. Furthermore, computations performed within the proof-of-work scheme are schematic as they are mainly bound by hash calculations. Such computations are easily implemented in specialized hardware which makes it hard for entities with general purpose hardware to compete in the mining process, and thus makes them less likely to engage the platform. General purpose computations are by definition best matched by general purpose hardware making the platform much more appealing to the general public.

Distributed storage and data distribution is also an area of ongoing development, but the previously proposed solutions do not make it viable to tie providing storage or uploading of data to currency or currency emission, which would further incentivize users to share their resources. Furthermore, it is believed that no distributed storage system that is tied to a payment or cryptocurrency emission system has been conceived before.

Aspects of the present disclosure are presented for a cryptocurrency based on distributed ledger technology, such as blockchain technology, where the main currency emission mechanism is tied to providing useful electronic resources such as computational power, storage, or connectivity to other nodes of the network, effectively creating a distributed computational cloud or supercomputer. Such resources should be provided in a secure (in case of computation sandboxed) environment in order to provide security for the nodes providing the resources. Stored data chunks may be encrypted in order to prevent the storage nodes from accessing the information. Resources should be provided on a non-exclusive basis, with a certain degree of redundancy to assure the nodes requesting the service about its integrity. Not all nodes have to provide the full spectrum of services. Some nodes can just connect to the network and just request services or simply transfer funds. The present disclosures allow free trading of electronic resources, and introduce a cryptocurrency that has its value associated with them, effectively building a supercomputer or a cloud platform where the nodes are rewarded monetarily for their participation.

Current solutions struggle with gauging inherent value tied to the cryptocurrency. For example, Bitcoin, and proof of capacity (POC) and proof of work (POW) blockchains generally, "reward" nodes with an amount of cryptocurrency based on solving "puzzles" that have no actual utility other than to prove that the node possessed enough power and capacity to satisfy a criterion determined by the cryptocurrency protocol itself. In contrast, aspects of the present disclosure define software that ties the generation of the cryptocurrency to actual work that is useful according to a separate entity within the network, namely, one who has commissioned work to be performed or data to be stored or retrieved. Examples include commissioning nodes to perform frame rendering in a computer animation, conduct an optimization routine for a complex problem, store a large amount of data, help simulate protein synthesis, or help compile a video. Traditional POC and POW blockchains do not commission the "puzzles" from anybody, and in a way are performed individually by each mining node (or pool). The proposed cryptocurrency of the present disclosure includes an explicit interaction between multiple nodes that relates a desired work or service to be performed in order to generate more currency and thereby tie the currency to something of inherent value. In addition, the distributed ledger that continues on after any request for work has been completed may be secured through means not necessarily based on processing power or storage space. For example, the distributed ledger may be secured using a variation of proof of stake concepts.

By tying the cryptocurrency to work or services that have value to nodes in the network and to an economic market generally, aspects of the present disclosure address the known issue with conventional cryptocurrencies that struggle to demonstrate inherent associated value in possessing such currency. Aside from blockchain properties, existing cryptocurrencies derive their value essentially from the fact that the quantities are finite and rare. Having their value not tied to any useful work or service, they are more akin to owning rare baseball cards or beanie babies, and thus their market value is largely based on hype and the latest trend or fad. Furthermore, some cryptocurrencies are also programmed to generate only a finite amount for all time, in an attempt to maintain value through the scarce resource philosophy. This will inevitably lead to deflation of the currency the more goods or services are traded using such currency. In contrast, the cryptocurrency of the present disclosure represents real work or services performed that have real value to the community, and has no preset limit as to the amount that can be generated over time. This allows for a more stable currency and one that can grow as the economy tied to the cryptocurrency grows.

Aspects of the present disclosure include a distributed, decentralized network of nodes that abides by algorithmic software to generate cryptocurrency derived from no centralized source and tied to useful work performed. In some embodiments, no particular entity adjudicates what the value of any work is. While a node may serve as a commissioning node for requesting work to be performed, said commissioning node does not necessarily have ultimate decision-making control for what other node(s) will perform the work, or how much the work is worth. Rather, all of the nodes abide by the software protocols. In other cases, a resource-giving/selling (work or storage) node may have some control over when they will decide to participate in the network protocol, by setting a price threshold for when they wish to honor service requests. Further descriptions to these mechanics will be detailed more below.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
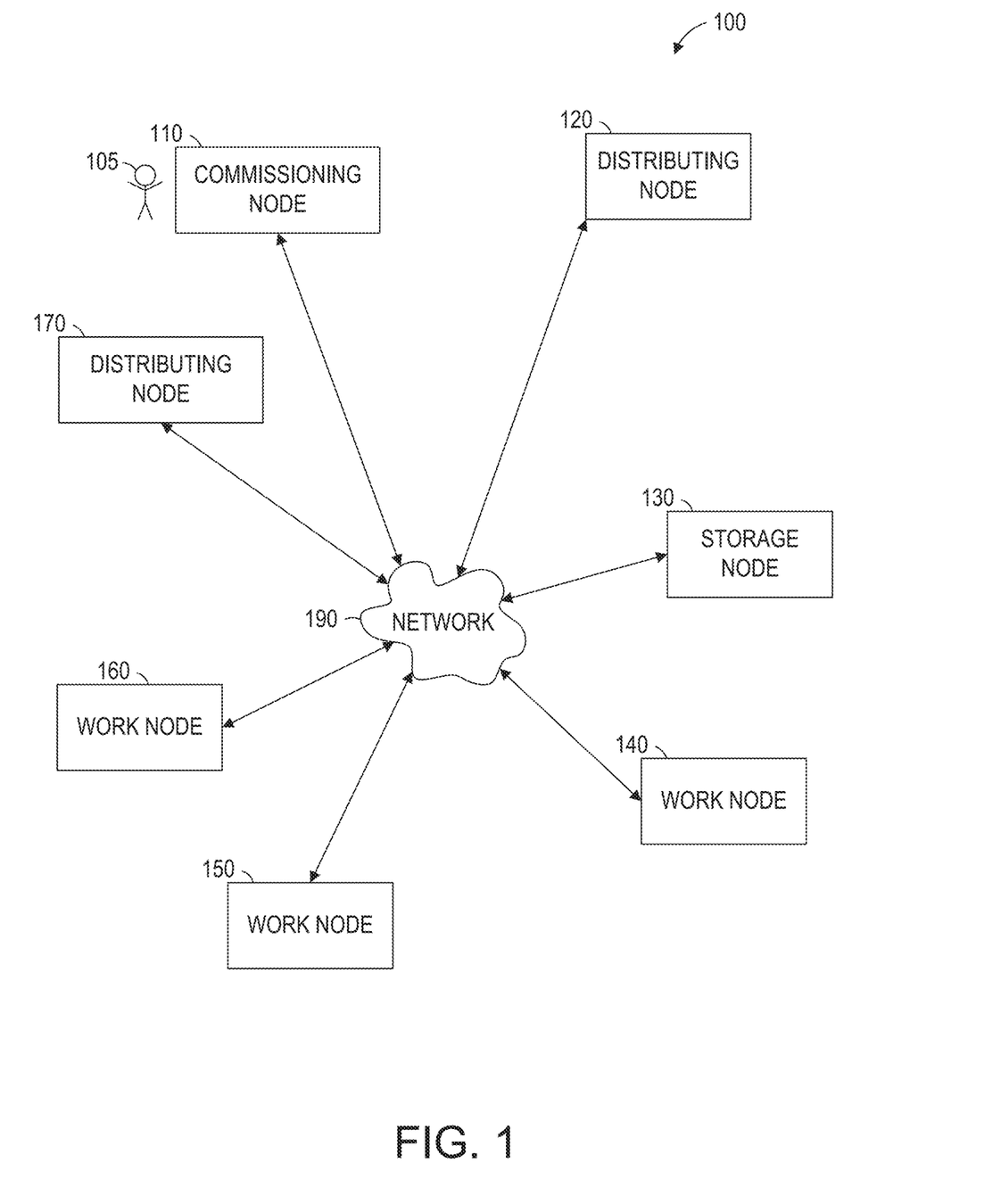
FIG. 1 is a network diagram illustrating an example network environment suitable for aspects of the present disclosure, according to some example embodiments.

Referring to FIG. 1, illustration 100 represents an example distributed network of nodes participating in a networked system to earn cryptocurrency based on blockchain technology and consistent with aspects of the present disclosure. A node in the network can be an ordinary computer or set of computers (e.g., server farm) with at least a portion of its processing power and storage devoted to performing one or more of the functions available to be a part of this system. In general, each node can opt to perform one or more of the following functions: commissioning or requesting work to be performed, performing the requested work, distributing or routing the requested work to other nodes, and storing data. Any node that performs a function useful to the commissioning or requesting node may be rewarded by the network according to the protocols of this cryptocurrency system, assuming the work has been verified to be valid and accurate. A single node may fulfill multiple of the aforementioned functions.

Still referring to FIG. 1, illustration 100 shows several examples of nodes that are configured to perform different functions available in this cryptocurrency system. Commissioning node 110 may be a node configured to request work to be performed. For example, the commissioning node 110 may be a computer or set of computers in a computer animation studio and wishes to request lighting rendering of several frames of a computer animation to be calculated by other computers. The commissioning node can send the desired frames, along with the needed algorithm/software instructing how to perform the task, out to the network 190. In some embodiments, the commissioning node 110 may break up the frames into chunks of data or executable code that can be handled by other computers in the network, and sometimes may be required to do this. In some embodiments, the network protocol may specify that chunk be submitted up to a predefined size, for example. In some embodiments, a human 105 may help in initiating the requested work.

The commissioning node 110 may also supply a digitally signed promise to reward nodes who complete the work with an amount of cryptocurrency, and should therefore have the resources (currency) to commission its work. In some cases, the act of requesting work to be performed has built-in information for providing notice about the amount of cryptocurrency the commissioning node can provide as a reward. For example, the act of transmitting a request for commissioning work, which may already be digitally signed by the commissioning node, may serve as the promise or contract, and the amount of currency the commissioning node possesses may be publicly viewable. Therefore, any node, including distributing nodes and working nodes, would be able to check if the request by the commissioning node is valid or at least the amount of currency that the commissioning node can pay out is acceptable the nodes, and may just ignore the request if it is not valid or not satisfactory.

The requested work (e.g., calculations) may be received by one or more distributing nodes, such as nodes 120 and 170, also sometimes referred to as routing nodes or intermediary nodes. Their functions are to transmit the requested work to multiple work nodes, e.g., nodes 140, 150, and 160, in an independent and intelligible manner. The choice of distributing node may be random or its identity hidden from the commissioning node, such that the distributing node is perceived as independent from the commissioning node, and therefore also serves as a check against the commissioning node cheating the system by "commissioning" work to itself or other colluding nodes. The distributing node would be responsible for verifying that the nodes completing the requested work are independent from the node requesting such work. In this way, by working through the distributing node 120, the nodes that perform the requested work (work nodes) will effectively be anonymous and be perceived as random to the commissioning node 110 who requested the work—at least until the results have been calculated or the nodes which store the data are initially set—thereby ensuring node independence during this process. In some embodiments, the distributing nodes may perform this work directly if certain criteria not dependent on the distributing node's operator are met. In such instances, the choice of what distributing node may directly perform the work may be limited for the commissioning node, such as only known nodes that are independent and the communications between the nodes must follow stricter security measures.

The distributing node 120 may also be tasked with subdividing the requested work into manageable data chunks, in some embodiments. To ensure an accurate result, the distributing node 120 may transmit the same requested work to multiple nodes, so that the work can be cross-checked by multiple nodes for accuracy. Notably, however, the work nodes do not cross-check their work amongst themselves, in order to maintain work independence and dispel notions of collusion or minimize the impact of improper communications. In some embodiments, the distributing node 120 may first send the work to another distributing node 170 for security purposes, which is described in more detail below. The distributing node 120 may also serve the function of relaying the completed work back to the commissioning node 110.

In some embodiments, only some portions of the requested work/storage may be transmitted to multiple work nodes, while others portions are sent to only a single node. For example, if the requested work is transmitted in multiple data chunks, only a random number of the chunks (the selections of which also could be random) are transmitted to multiple nodes. The idea is that the redundancy in having multiple nodes work on only some of the work may be a sufficient deterrent to make it economically infeasible for nodes to cheat or collude, since the nodes are aware of the possibility of their work being checked, but not actually know if their work truly is.

The work nodes 140, 150, and 160, also referred to herein as executing nodes, receive the requested work and perform the desired calculations. As each work node may not be created equally, where some nodes are more powerful than others, their capabilities, including dedicated processing power and memory, may be disclosed to the network to enable distributing nodes to know how much work can be given to any work node. Each node should be independent of each other, in that no node should be able to influence decisions or results from any other node. Safeguards to maintain this independence will be described in more detail, below. Once the work is completed, the work node may transmit the result back through the network with identifiable information sufficient for the distributing node 120 to receive the data before sending it back to the commissioning node 110. During transit from the work node, the completed work may be encrypted by a key provided by the commissioning node or a previous distributing node. On the other hand, the commissioned work itself can be encrypted by a key provided (in a readiness reply) by the executing node.

In some embodiments, one or more storage nodes 130 are also present in the network and configured to store any desired information as part of the same or separate service within the network. In some cases, the commissioning node 110 may commission a task to simply store an amount of data, for a fee to be rewarded by one or more storage nodes 130 that allocate such space for a period of time. In other cases, it may be necessary for a storage node 130 to participate in a request to perform work by other nodes. For example, a work node may lack sufficient allocated memory to completely store all data of a data chunk, and may rely on a storage node to temporarily store at least a portion of the data chunk during processing.

In all of these examples, a blockchain or other similar distributed ledger tied to the cryptocurrency that is associated with the requested work by the commissioning node 110 may be used to record every step in the transaction. Thus, the blockchain or other similar distributed ledger can be used to reliably verify the chain of events and interactions between the commissioning node 110, the one or more distributing nodes 120 and 170, the one or more work nodes 140, 150, and 160, and the storage node 130, if applicable.

In the example of FIG. 1, each node shown should act independently of each other, for a given work request. However, any particular node may perform a different function in this cryptocurrency system (even simultaneously), just for a different work request. Thus, the commissioning node 110 may act as a distributing node, storage node, or work node, for a different work request that is commissioned by another node, e.g., node 120, 150, or 130, as just one example.

Each full node of the network is identified by an ID, such as the node's public key or equivalent transformation thereof, and includes a program for abiding by the protocols of the present disclosures and:

access to a copy of the blockchain—the ledger, either by possessing its own copy or knowing how to reference a complete copy;

an overlay routing table that contains at least some of its peers' addresses;

and at least one of the following:

a secured computational sandbox. The secured computational sandbox may be configured to partition off a finite amount of memory and processing power of a computer, such that the domain in the sandbox is not allowed to communicate to the rest of the computer and to the rest of the outside world that can normally communicate with said computer. This will prevent the node from being used as a part of a botnet, ensure fault isolation, and help secure the node from accessing other memory regions or parts of the host computer that may hold the computer users' data not meant for disclosure or facilitate other nodes, for example. Examples of sandboxes include an LLVM based sandbox used in chromium for PNaCl, a sandbox withn Docker, a VMware virtual machine or the sandboxed envronment within Webassebly; or some storage space allocable by the network.

Figure 2:
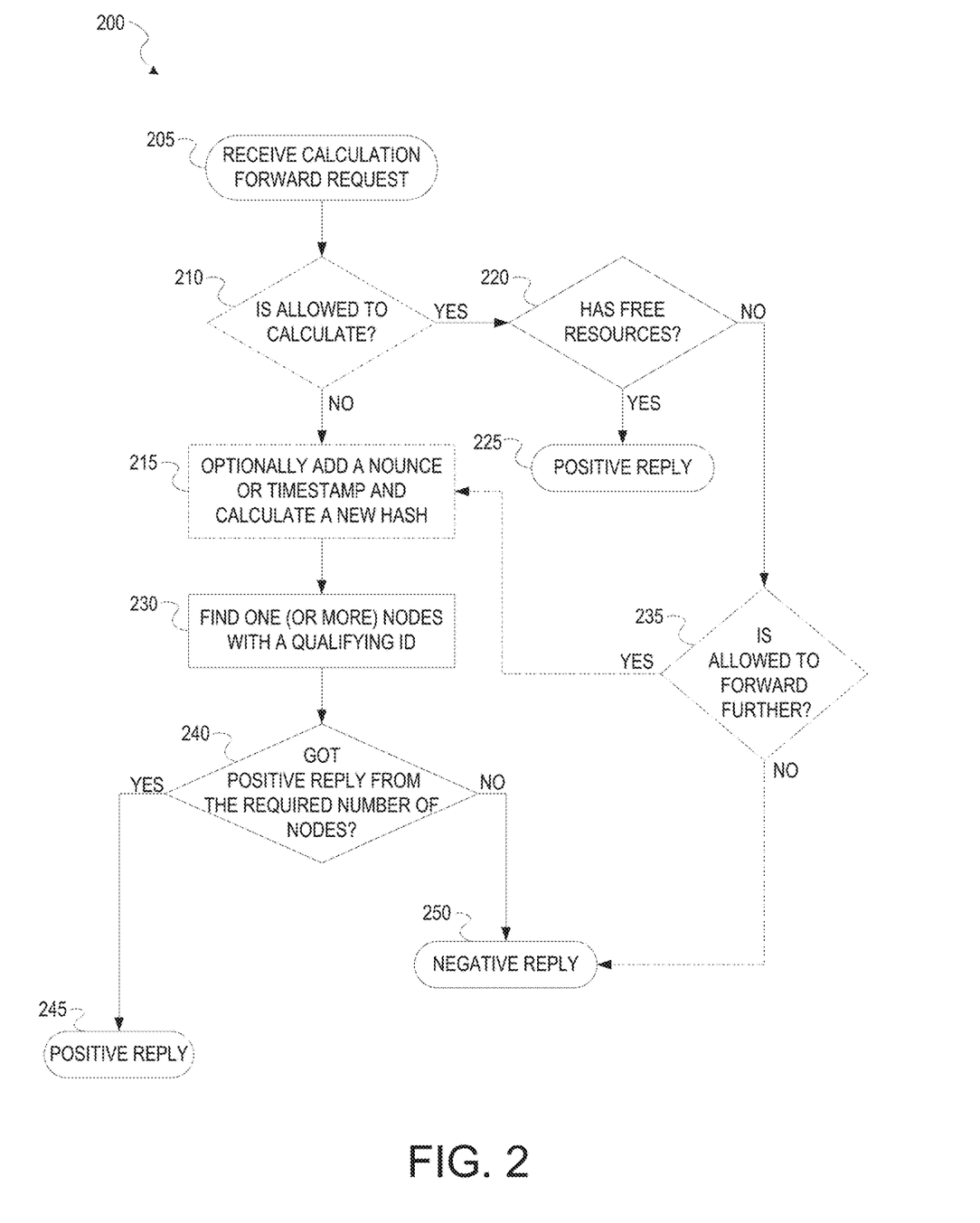
FIG. 2 is an example flowchart showing what a node does when it receives a service forward request.

Referring to FIG. 2, flowchart 200 provides example protocol sequences for a node to follow when it receives a request to perform a calculation. In this example, the calculation request is forwarded to a node from a commissioning node, and it is not known by the commissioning node a priori whether the node receiving the request is a distributed node or a working node. The example protocol in flowchart 200 allows for the receiving node to act in either capacity, and thus this protocol may be replicated at all nodes.

Starting at block 205, a receiving node receives a calculation forward request. The request could be to perform any number of calculations deemed useful by the commissioning node, such as rendering a portion of an animation frame, calculating protein synthesis for modeling a chemical composition, performing one or more branches of an optimization scheme, and so forth. The forward request includes both instructions to perform a task and also instructions to forward the task along to another known node, regardless of whether the receiving node is capable of performing the task.

At block 210, the receiving node determines whether it is allowed to performe the request calculation. The receiving node may not be able to because the node is currently processing another task and lacks additional bandwidth, or the node did not possess enough capacity (power and/or memory) to perform the task, or the node is not currently configured to perform work and is only configured to forward requests and/or store data.

If the receiving node is not allowed to calculate, then at block 215, in some embodiments, the receiving node may add a nounce or timestamp to the blockchain and calculate a new hash in order to forward the request to another node. In this path, the receiving node proceeds to block 230, where the receiving node then finds one or more nodes with a qualifying ID that satisfies certain criteria for maintaining work independence and avoiding chances to collude or manipulate the work process. For example, the potential work node that is found by the receiving node may need to have an ID or address that is known to be owned or controlled by a different entity from both the receiving node and the commissioning node, in order to be more confident that the nodes will not conspire together to game the system. The nodes with qualifying IDs lead to block 240. If enough connected nodes send back positive replies, then the current receiving node can send back a positive reply to the requesting node, at block 245. This signals that the calculation request can successfully be forwarded to this receiving node, in which case the requesting node will know to forward the actual task and calculations to be performed thereafter. If the receiving node does not receive enough positive replies from its neighboring nodes, then a negative reply will be issued to the requesting node, at block 250.

Moving down the other branch, referring back to block 210, if the receiving node is allowed calculate, then at block 220, the receiving node determines whether it has enough free resources to perform the task. The information to determine whether enough free resources are available may be based on metadata provided by the requesting node, which supplies an amount of expected memory necessary to perform the task and estimated processing power needed. If it does, then the receiving node sends a positive reply back, at block 225. If it does not, then the protocol proceeds to block 235. Here, the receiving node determines if it is allowed to forward the request to other nodes. It may not be able to because the receiving node is not configured to act as a distributing node, or it may lack the resources to do so momentarily. If it does not, then a negative reply is posted at block 250. If it is, then the protocol proceeds back to block 215, which is described above.

As can be seen, this process can be repeated for each node in series in the network, for any request to perform work initiated by a commissioning node. Based on this example flowchart, one can see how a purely distributing node may act within this protocol, and how a purely working node may also act. One can also see how a node that functions both as a distributing node for some cases and a working node for other cases can also follow this flowchart.

The flowchart of FIG. 2 can also be applied to determining storage nodes, for the instances that a commissioning node requests data to be stored. Analogously, the threshold question at block 210 may be whether the node is allowed to provide storage capacity. The other blocks in flowchart 200 may be applied similarly in order to find additional nodes that can provide the requested storage.

In some embodiments, when a node wants to perform computations, it has to split up the work into several computational chunks. Each computational chunk can be executed by a different machine and should (can) be limited to a certain number of instructions i. If the computational chunk generates substantially large auxiliary data or needs to download extra data in order to process the instructions within the chunk, and the calculations are not complete within i instructions, the nodes can agree that the chunk continues to run up to next ni instructions which should (can) be rewarded as calculating n chunks. Alternatively, the payment for a chunk can be adjusted by the (possibly weighted) number of instructions it took to complete (which can also be limited).

Figure 3:
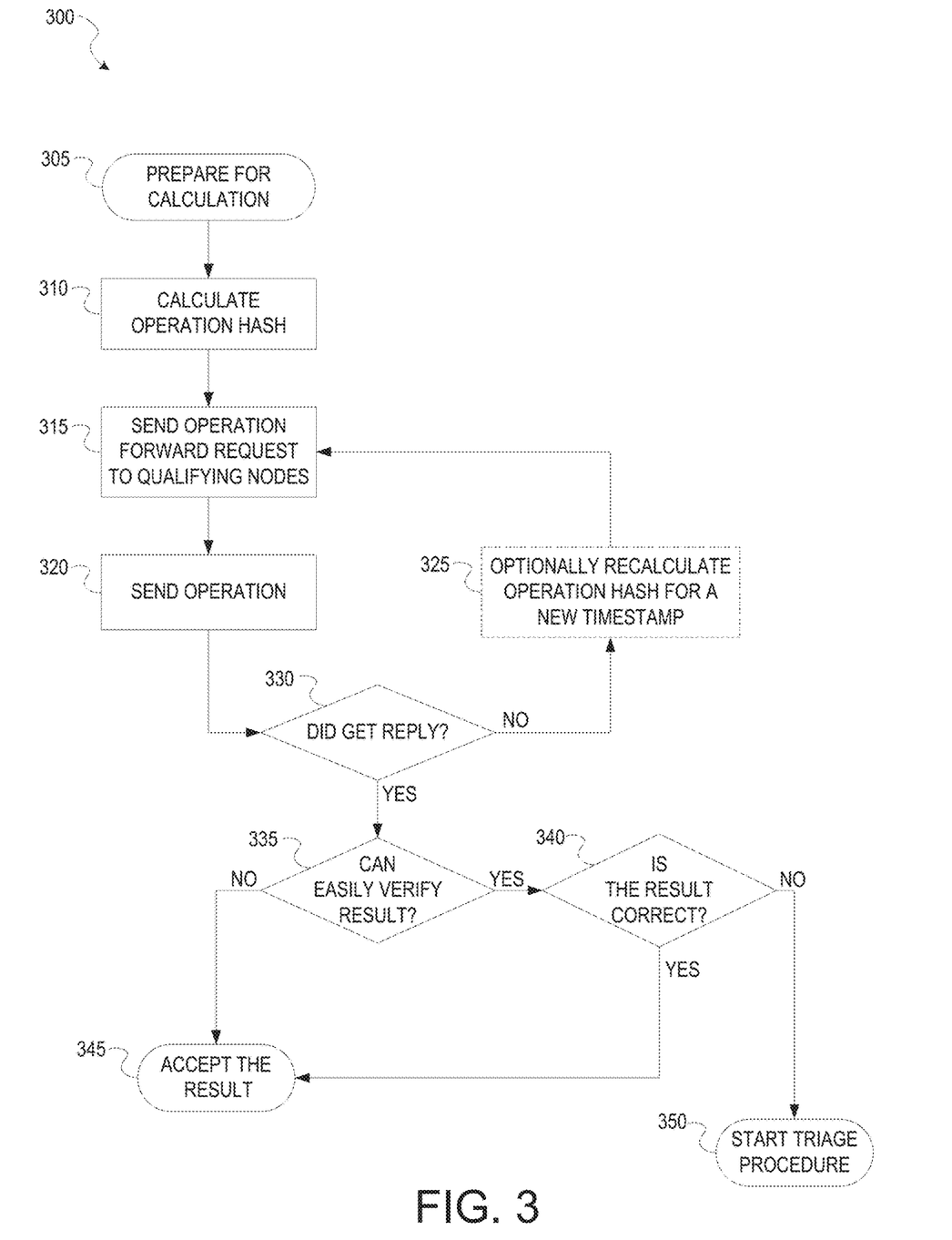
FIG. 3 is an example flowchart showing how a node sends out calculation chunks to other nodes.

Referring to FIG. 3, flowchart 300 provides an example for how a node sends out calculation chunks to other nodes. In some cases, the commissioning node may perform this procedure, while in other cases one or more distributing nodes may perform this procedure.

Starting at block 305, the node configured to perform this procedure prepares to perform one or more calculations. At block 310, the node calculates an operation hash. This hash may be used to determine the criteria for what constitutes a qualifying node ID. At block 315, the node then sends an operation forward request to the qualifying nodes that it is aware of. These nodes may be determined by the protocol described in FIG. 2.

At block 320, the node then sends the operation to the qualifying nodes. The operation may include the data to be manipulated and the instructions for performing the task.

At block 330, the node listens for any replies from the qualifying node(s). After some time, and in some cases according to expected timeframe based on the operation hash, the node determines whether a new operation hash should be calculated. If a reply was not received in time, then at block 325, the node may optionally recalculate an operation hash for a new time stamp, and then proceeds back to block 315.

If a reply was received, then the node undergoes a verification process to determine whether the result is valid. At block 335, the node determines whether the result is easily verifiable. This determination may be based on some threshold criterion that is specified by the network protocol for developing the cryptocurrency. If the result is easily verifiable, then at block 340, the node determines whether the result is correct. If it is, then the node accepts the result at block 345. If it is not, then the node may collect additional results from other qualifying nodes to start a triage procedure at block 350. If the result is not easily verifiable, then the result is accepted by default and passed on back up the communication line and ultimately to the commissioning node. The commissioning node may be configured to perform more advanced verification procedures to determine whether the result is correct.

Note that computational chunks can be split into two categories: ones where the result is trivial to verify (V chunks), and ones where it is computationally expensive (up to the difficulty of redoing the calculation entirely) to verify the result (NV chunks).

Since the cryptocurrency and distributed ledger design of the present disclosure is tied to a reward with the performing of the calculation, the decentralized network must defend against cheater nodes that send bad (e.g., fake, inerrant, or fraudulent) results—especially for the NV chunks.

To do that, in some embodiments, included are mechanisms to make sure such an offense is statistically unprofitable.

For example, in order to do that the network could:
perform the calculations with some degree of redundancy, and/or
exercise a (monetary) punishment on a node that performs bad calculations.

For the redundancy being able to check whether the calculation was performed correctly, in some embodiments, it will be required that the computation of a computational chunk be repeatable, such that the result must be the same no matter on what node it was calculated.

For example, if node A pays p coins for a computational or a data chunk, and each node calculating or storing or sending the chunk receives c coins in compensation, and the chunk is computed or stored redundantly r times ($1 \le r$) (where of course r can be fractional and smaller than 2—meaning that it is random which chunks will be calculated or stored redundantly) $cr-p$ coins are statistically emitted after the processing of a chunk is accepted by the network.

Such currency emission mechanism makes its supply grow as the number of processed chunks grows, thus linking the supply of the currency with a useful service.

To exercise the monetary punishment, in some embodiments, the work and storage nodes may be required per protocol to hold cryptocurrency collateral of sorts before performing any work. The mechanism to post the collateral may be achieved through abiding by a contract upon agreeing to perform the work, wherein if the finished work by the work node is determined to be incorrect or fraudulent, currency is deducted from the work node's balance.

In some embodiments, the compensation can vary between different nodes (as to allow them to adjust for different hardware or electricity costs, and for different availability and/or rating assessed either by the nodes themselves or by the network based on historical performance). The compensation can also be adjusted based on the resource providing node's collateral that it might be required to provide in order to ensure that the monetary punishment mentioned earlier is enforceable. In some embodiments, the compensation (as well the required collateral) could fall with either time or amount of serviced resources, bringing the emitted amount of coins to 0 or even below, thus linking the supply of the currency to the throughput of the network instead of amount of serviced resources. The decreasing of the necessary collateral and/or rating needed for a good compensation can motivate nodes to stay available under the same address (ID). The redundancy can also vary—if nodes with lower rating are used, a higher degree of redundancy can be used.

Generally, the system typically relies on the perception of independent acting nodes and may determine the correctness of a result by consensus or a super majority of some kind. One possible way for cheater nodes to take advantage of the decentralized system is if a conglomerate of cheater nodes flood the network and conspire or collude to produce the same bad or fraudulent results. These bad actors could all conspire to uniformly produce the same wrong results, in less time, and the large number of them may cause the system to be tricked into thinking this result is correct. If performing of the calculations is tied with currency emission—that is the amount of currency that is required to perform a calculation is not statistically equal to the amount of currency spent on those calculations, the network must make it very unlikely for an adversary that introduces many nodes into the network to be able to subvert the redundancy by synchronizing the nodes to return the same (potentially corrupt) results.

To address this issue, as an example, a node that wants to perform a computation (or other service) sends out the request to the network using an anonymizing algorithm. Such algorithm should:
1. Prevent the work (executing) or storage node to know which node the request originated from;
2. Prevent the commissioning (requesting) node from targeting a specific node to execute or store on; and
3. Prevent the work (executing) or storage node to know what other nodes might repeat the calculation (or service) (redundantly).

One such algorithm could be sending the request from the commissioning node 110 through a random node that acts as a distributing node 120, that in some embodiments could again pick further random (work) nodes, e.g., nodes 140, 150, 160, to execute or optionally forward the request further.

For the following algorithm, the node ID should be a number exhibiting bit distribution characteristics of a hash value and could be based on the node's public key, according to some embodiments. This will help provide anonymization of the nodes to help prevent collusion.

The distribution node 120 should also not be one that is designed to collude with the work nodes, lest the distribution node 120 somehow send the requesting work to its fellow bad actors or rig the system in other non-random ways. To make sure the distribution node 120 picked by the requesting node 110 is random (as to assert trait 2) the node ID may be required to fulfill certain criteria dependent on the request hash, such as sharing a certain number of bits with the hash of the request (or a similar mechanism like being close numerically to it (for instance in a modular (modulo maximum hash value) arithmetic)). The number of shared bits may be e bits less than the number of bits b that it takes to fit the number of active nodes in the network ($b=\lceil \log 2(s) \rceil$, in other words the integer round-up of base 2 log(s), where s is the number of active nodes). Assuming the IDs of the nodes are quasi random, there should on average be over $2^{b-e}$ nodes that fulfill such a criterion, yet the probability that a randomly picked node is within this set is around $1/(2^{b'})$, thus an attacker with a nodes within the network would have an $a/(2^{b-e})$ chance of being able to pick a first routing node from within his/her own nodes. To make a sybil attack economically inviable, the routing (distributing) nodes may be required to hold a certain amount of currency (as in Proof-of-Stake) to be eligible routing nodes. In such a case, the algorithm should only use the estimated number of eligible nodes (as s), not the size of the entire network. To enhance the security further, the network may require that each routing (distributing) node signs the route and performs at least a few bounces (i.e., communications to other nodes) through other randomly selected active nodes or that a few nodes are picked by the requesting node (by either using different bits from the request hash or rehashing the request with added data such as a timestamp or their ID) and they then all influence the choice of the executing node. In case of further routing, nodes might not be informed on what the original hash of the requested calculation is, but they can be informed on how many more bounces are allowed and/or required. For example, distributing node 120 may forward the request of work from commissioning node 110 to a random node, that happens to be distributing node 170, who then forwards to one or more work nodes, e.g., 140, 150, 160. In such a case, once a node receives a request where 0 further bounces are required, the node can perform the calculation and return the result via the formed anonymizing chain. To introduce redundancy, each routing (distributing) node would, with some probability, forward the request to more than one node, e.g., in case of 2 nodes, the probability being $p=(r+1)/(2r+1)$ for unlimited anonymizing chain length and a vast network, and $p=1-r$ for just one forwarding node. In some embodiments, more than 2 redundantly calculating nodes might be useful as to make it not certain for a possible adversary to be sure that all nodes performing a given calculation belong to her/him if 2 (or generally a hard set number of) nodes controlled by her/him receive the same chunk.

In the above scenario, the network would be able to query for active nodes which fulfill the given ID (address) criteria.

Generally, the idea is to limit the number of eligible nodes (to be picked as distributing/forwarding nodes) so that the probability of them being sybil nodes (that is nodes controlled by the same bad actor—as in a sybil attack) is reduced drastically. To know how much the number of eligible nodes may be reduced to, a network size estimation algorithm may be used to always have a sizable pool.

As an additional security measure, in some embodiments the nodes requesting calculations should be able to provide, for some time, the requested calculation chunks to any node that wants to verify it and the result.

As an additional security measure, the distributing nodes might be required to hold a certain amount of currency over some time to be able to be eligible distributing (routing) nodes.

Additionally, in some embodiments, to prevent nodes from requesting calculations that can be more efficiently done by a better algorithm and counting on getting the chunk by a different node controlled by the same actor, a checksum of the executed instructions or a well-defined intermediary state can be attached to the result.

Practically speaking, the network protocol may not be able to truly determine or ascertain who the party ultimately controlling a node is, but assuming that the majority or at least a sizable amount of operators is honest, the described safeguards herein can keep the dishonest operators in check by requiring them to pass the work onto in a way random nodes which with chance will then sometimes hit an honest node that will expose the scam.

In some embodiments, nodes may also need to quickly assess the number of active (or eligible) nodes in the network to determine b. This could be done with algorithms such as proposed by Evans, Polot, and Grotho in "Efficient and Secure Decentralized Network Size Estimation."

The anonymizing chain can be constructed with algorithms such as ones used within the Tor on the I2P networks i.e., onion and garlic routing, as some examples.

Figure 4:
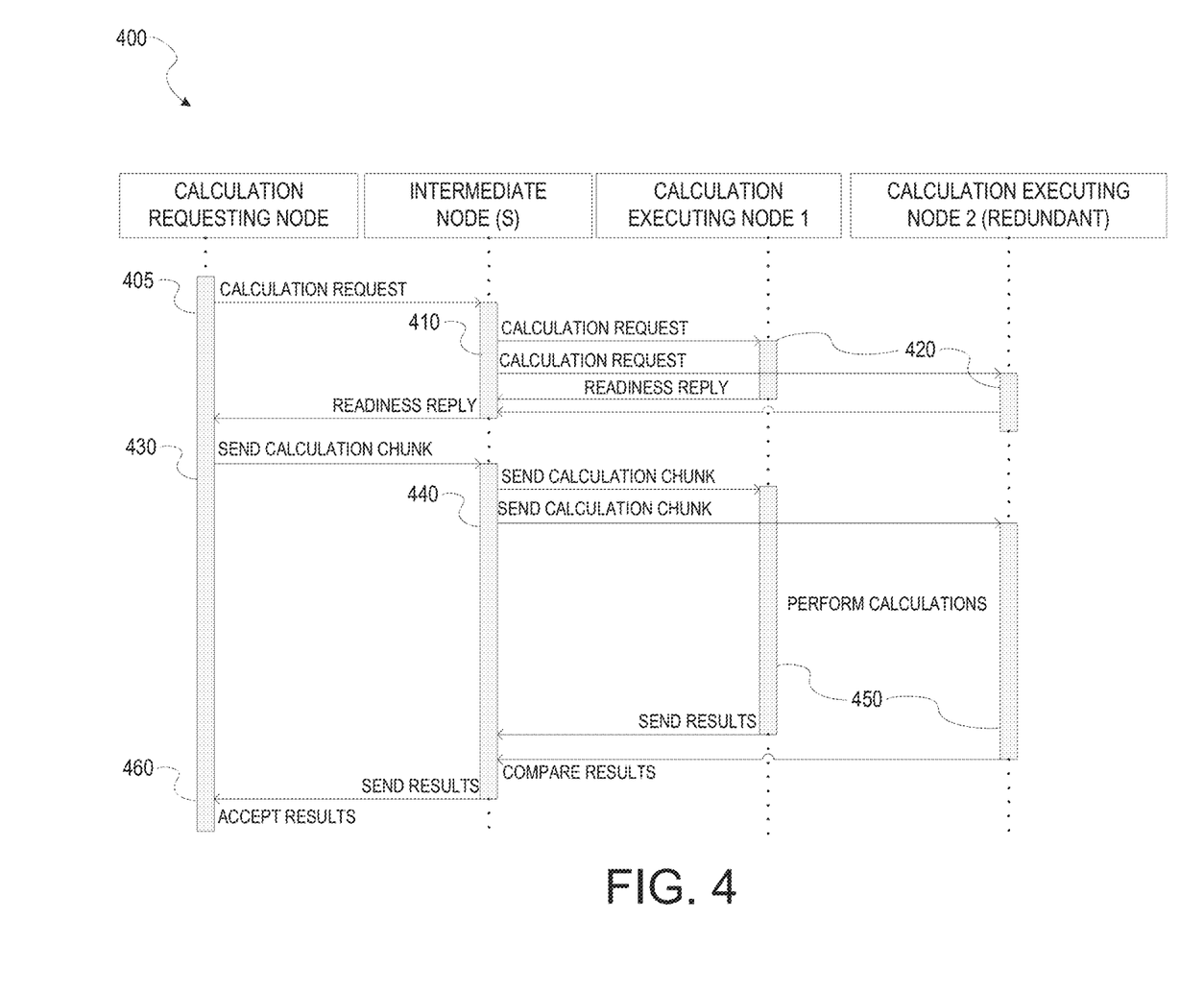
FIG. 4 shows a possible sequence related to a calculation request.

Once a node computes the result, it is sent back to the requesting node along the chain that was created while the request was sent (in contrast to the implementation within I2P where there are distinct inbound and outbound unidirectional tunnels), in accordance with the message protocol described in FIG. 4, for example. Illustration 400 of FIG. 4 provides one example of a chain of communications between the calculation requesting (commissioning) node, one or more intermediate (distributing) nodes, and one or more calculation executing (work) nodes. As described herein, there may be more than one intermediate nodes for security and/or verifiability reasons. Consistent with the general chain of communications described in FIGS. 1, 2, and 3, starting at position 405, the calculation requesting node transmits a calculation request to one or more intermediate nodes. At position 410, the intermediate node(s) forwards the calculation request to a first calculation executing node, and may also do the same to a second redundant calculation executing node. At position 420, these calculation executing nodes may send back to the intermediate node an indication of their readiness to perform such a calculation. The intermediate node(s) then send the readiness reply back to the requesting node.

Having obtained a sufficient number of positive readiness replies (see e.g., FIG. 2), the calculation requesting node then sends calculation chunks of the work it wants performed, at position 430, to the intermediate node(s) (see, e.g., FIG. 3). The intermediate node(s) then transmit the calculation chunks to the one or more executing nodes, at position 440, and wait for results to come back. At position 450, the calculation executing nodes perform their instructed tasks, and ultimately send their results back to the intermediate node(s) when completed. The results may then be compared at the intermediate node(s) if they are easily verifiable. A triage process may occur if there are discrepancies, and in any case, at position 460, the results get sent back to the requesting node to ultimately verify the result and accept the results.

To reward the executing (work) nodes, and to tie the generation of the cryptocurrency with the valued work performed, the calculation requesting (commissioning) node may follow network protocols by submitting a promise to remit an amount of cryptocurrency to the network along with its request to perform the work (at block 405). For example, the requesting node may pay to the network 100 units of currency. Also following network protocols, the calculation executing (work) nodes may agree to perform the requested calculations for a fraction of the remitted currency by the requesting node, where the sum total of all amounts that all of the executing nodes may earn is a multiple higher (e.g., 10% more, 25% more) than the amount remitted by the requesting node that was used to commission the work in the first place. For example, for ten executing nodes, each node may be promised to be paid 12.5 units of currency, for a total of 125 units vs. the 100 units initially remitted by the requesting node. These amounts may be defined by the network protocol of the present disclosures, where the net currency earned by the executing nodes is higher than the initial amount remitted by the requesting node, reflecting the added time and energy inputted into the network for performing the requested work. Once the results are sent back to the commissioning node and accepted (at block 460), the network protocol may generate the rewarded currency and deliver them appropriately to the executing nodes. All of these transaction agreements may be recorded in the distributed ledger, though in some embodiments only some of these agreements are recorded. Ultimately, the cryptocurrency is generated by recording the earned amount in the distributed ledger, and transactions useful for justifying the generation of the cryptocurrency may be recorded as well.

In addition, the intermediate (distributing) node(s) may also be promised a currency reward for facilitating the calculation request and overall performance of work. The network protocol may specify that the calculation requesting node must allot a portion of its remittance to pay the intermediate node(s). The intermediate node(s) may accept the responsibilities of acting as the intermediary and receive a cryptocurrency reward some multiple higher than the amount supplied by the requesting node, similar to the mechanism described above. Upon completion of the work and acceptance of the results by the requesting node, the intermediate node(s) may receive the stated reward, where the net currency exchanged is higher than the initial amount remitted by the requesting node, reflecting the added time and energy inputted into the network for performing the responsibilities of the intermediate node(s). These transactions may also be recorded in the distributed ledger.

In this way, the overall currency supply grows over time, and is tied to actual valued work performed in the network, where the amount of growth of the currency is commensurate with actual work performed and perceived value of the result. Having this currency be based on solid backing of real and valued work, rather than being merely a scarce resource, the disclosed generation of cryptocurrency according to this network protocol should therefore guard against unreasonable inflation or deflation.

One possible way to build such a chain or tunnel is for a resource providing (executing) node to send an asymmetric encryption key along with a positive calculation request reply—this would make the content of a sent calculation chunk inaccessible to a forwarding node. In case such end to end encryption is not used or an encryption key is provided by the requesting node, redundant results are verified along the way. In case of a mismatch, a triage procedure is started where further nodes are asked to calculate the result. When a majority decision as to which calculation results were correct is formed, the node or nodes which provided a wrong result can be punished by subtracting a certain amount of funds from their account. In order to be sure that the bad result was indeed introduced by a specific node, each node should digitally sign the result it is providing. In alternative embodiments, the results can be sent directly to the requesting node or via a different anonymizing chain (akin to I2P's inbound/outbound tunnels).

In order to be able to execute the possible punishment, the system can prevent nodes from spending (transferring to other nodes) their currency before they reach a certain threshold, or prevent nodes that do not have a sufficient (for the execution of punishment) amount of currency to partake in sharing their resources (either at all, or just those not provided redundantly). As another example, participating nodes may be required to post collateral before engaging in the currency generating process. The currency may be conditionally locked per the network protocol such that no node should accept funds that are locked, and information recording these events may be made into the distributed ledger.

In some embodiments, if a commissioning node (e.g., node 110) requesting the calculations disputes the result of the calculations, the calculation chunk can be added to the ledger (as in onto the blockchain) for further verification by anybody who verifies its integrity (as in stakers/miners). The same can be true for calculation executing nodes (e.g., nodes 140, 150, 160).

In some embodiments, the requesting node might be required to hold the requested work for a while and send it to any party that wants to verify that real work was indeed commissioned.

As previously mentioned, nodes providing storage can be another useful service that can be rewarded in the system of the present disclosures. To organize the storage, the system can utilize algorithms fashioned after ones proposed in "BitTorrent Protocol Specification v1.0"; "Kademlia: A Peer-to-peer Information System Based on the XOR Metric" by Petar Maymounkov, and David Mazières; "Analysis of Six Distributed File Systems" by Benjamin Depardon, Gaël Le Mahec, Cyril Séguin; or "Feasibility of a Serverless Distributed File System Deployed on an Existing Set of Desktop PCs" by William J. Bolosky, John R. Douceur, David Ely, and Marvin Theimer. Since the nodes within the system should not be assumed to trust each other, and are not expected to be on all the time, storage needs to be offered redundantly, in most implementations (but not necessarily) to a much higher degree than calculations. The system can use additional heuristics such as historical availability, user declared probable availability, and data access patterns, and user declared importance to optimize across which nodes the data is redundantly spread. The system can have a data expiry date to prevent abandoned data chunks clogging up the system. Possible reward (compensation) scenarios may include:

when a data chunk is successfully retrieved; and
up front reward with a deduction when a data chunk is not possible to retrieve. This approach might require locking up the rewarded currency until the data has reached its expiry date.

To determine the expiry date, the commissioning node may specify the amount of time it wants the data to be stored. In some cases the storage node (e.g., node 130) storing the data is authorized according to the network protocol to determine how long it is to be kept. The storage node 130 may transmit an acknowledgement and an expiry date or time for how long the data will be stored. This can correspond to how much currency is to be generated by such storage. If this time period is too short compared to the request, the data may be stored one or more other storage nodes to make up for the remaining time, and the storage node will accept a pro-rata portion of currency commensurate with the proportional amount of time it could store the data, less some handling fee or discount, in some embodiments. The storage node that cannot handle the entire specified time period may notify the network in advance of its departure.

In some embodiments, the currency on the commissioning node's account might be per protocol frozen as to assure that the storage nodes are paid without creating additional currency to bail out the commissioning node (which would probably lead to uncontrolled inflation).

In other cases, a more advanced technique would be to see how often the data is being requested, which would tie in well with a model where the storing node 130 gets paid for each download. In such a model, the storing nodes could know what other chunks of data determine a full set so that the whole set can be expired at once. Again, in some embodiments, the uploading (commissioning) node would determine below what download frequency the data set can expire. In some embodiments, a part of the reward given to the storage nodes can be given to the uploading node. This could be useful for data sharing applications where the uploader is rewarded by the users downloading or streaming the content.

The currency emission mechanism in case of storage can, as described above, be based on having the sum of rewards (compensations) for storage providing nodes greater than the amount paid by the node asking to store data.

In case of a sudden surge in interest in a certain data peer-to-peer file, sharing tactics may be used similar to ones in BitTorrent protocol.

Since calculations sent to be executed by other nodes might require more input data than is practical to send together with the code that defines the calculation chunks, in some embodiments the code executed within the sandbox environment can have access to data stored within the system as described above. In some embodiments, the computational sandbox environment can also be allowed to store temporary data within the distributed file storage.

In some embodiments, a node may store the data chunks anonymously by forming anonymizing chains before uploading data. If a node wants to have an option to delete data before the expiry date (or change such date), the data chunks can have a digital signature—the deletion (or expiry data change) request can then be sent via a message that is signed with the same private key as the signature of the data chunk itself—and can then be honored by a complying node. In some embodiments, such a request can be put into the ledger and all complying nodes shall actively block transferring of chunks that are deemed to be deleted by the owners or in some embodiments also ones that are past their expiry date. For the data storage to be anonymous, the private/public key pair used to sign the data chunks can be different from the private/public key pair determining the node ID.

In general, each of the transactions and communications between nodes at each step or its hash in the process to perform work for a commissioning node may be recorded in the ledger, though it may not be necessary to record all steps. Information sufficient to determine that the currency was generated legitimately and for what purpose may be all that is required to be recorded in the ledger. The process for verifying the proper chain of events in the ledger may be consistent with known decentralized protocols originally introduced with the distributed ledger concept, and may include any known improvements or efficiencies in keeping records in the ledger according to those with skill in the art.

Figure 5:
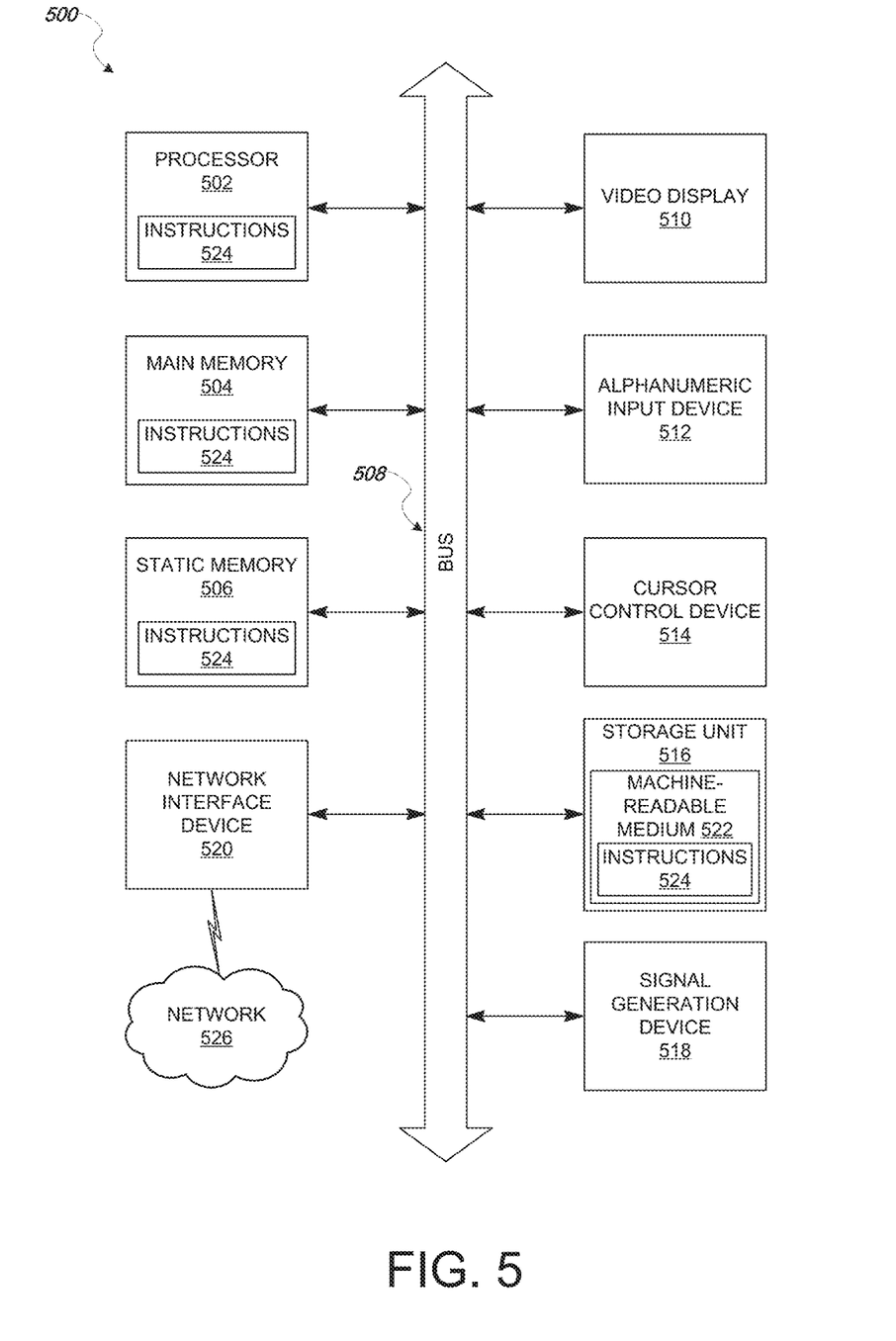
FIG. 5 is a block diagram illustrating components of a machine, according to some example embodiments, able to read instructions from a machine-readable medium and perform any one or more of the methodologies discussed herein.

Referring to FIG. 5, the block diagram illustrates components of a machine 500, according to some example embodiments, able to read instructions 524 from a machine-readable medium 522 (e.g., a non-transitory machine-readable medium, a machine-readable storage medium, a computer-readable storage medium, or any suitable combination thereof) and perform any one or more of the methodologies discussed herein, in whole or in part. Specifically, FIG. 5 shows the machine 500 in the example form of a computer system (e.g., a computer) within which the instructions 524 (e.g., software, a program, an application, an applet, an app, or other executable code) for causing the machine 500 to perform any one or more of the methodologies discussed herein may be executed, in whole or in part.

In alternative embodiments, the machine 500 operates as a standalone device or may be connected (e.g., networked) to other machines. In a networked deployment, the machine 500 may operate in the capacity of a server machine 110 or a client machine in a server-client network environment, or as a peer machine in a distributed (e.g., peer-to-peer) network environment. The machine 500 may include hardware, software, or combinations thereof, and may, as example, be a server computer, a client computer, a personal computer (PC), a game console, a Network Attached Storage (NAS) device, a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 524, sequentially or otherwise, that specify actions to be taken by that machine. Further, while only a single machine 500 is illustrated, the term "machine" shall also be taken to include any collection of machines that individually or jointly execute the instructions 524 to perform all or part of any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The processor 502 may contain microcircuits that are configurable, temporarily or permanently, by some or all of the instructions 524 such that the processor 502 is configurable to perform any one or more of the methodologies described herein, in whole or in part. For example, a set of one or more microcircuits of the processor 502 may be configurable to execute one or more modules (e.g., software modules) described herein.

The machine 500 may further include a video display 510 (e.g., a plasma display panel (PDP), a light emitting diode (LED) display, a liquid crystal display (LCD), a projector, a cathode ray tube (CRT), or any other display capable of displaying graphics or video). The machine 500 may also include an alphanumeric input device 512 (e.g., a keyboard or keypad), a cursor control device 514 (e.g., a mouse, a touchpad, a trackball, a joystick, a motion sensor, an eye tracking device, or other pointing instrument), a storage unit 516, a signal generation device 518 (e.g., a sound card, an amplifier, a speaker, a headphone jack, or any suitable combination thereof), and a network interface device 520.

The storage unit 516 includes the machine-readable medium 522 (e.g., a tangible and non-transitory machine-readable storage medium) on which are stored the instructions 524 embodying any one or more of the methodologies or functions described herein, including, for example, any of the descriptions of FIGS. 1-4. The instructions 524 may also reside, completely or at least partially, within the main memory 504, within the processor 502 (e.g., within the processor's cache memory), or both, before or during execution thereof by the machine 500. The instructions 524 may also reside in the static memory 506.

Accordingly, the main memory 504 and the processor 502 may be considered machine-readable media 522 (e.g., tangible and non-transitory machine-readable media). The instructions 524 may be transmitted or received over a network 526 via the network interface device 520. For example, the network interface device 520 may communicate the instructions 524 using any one or more transfer protocols (e.g., HTTP). The machine 500 may also represent example means for performing any of the functions described herein, including the processes described in FIGS. 1-4.

In some example embodiments, the machine 500 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 522 able to store data temporarily or permanently and may be taken to include, but not be limited to, random-access memory (RAM), read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database 115, or associated caches and servers) able to store instructions 524. The term "machine-readable medium" shall also be taken to include any medium, or combination of multiple media, that is capable of storing the instructions 524 for execution by the machine 500, such that the instructions 524, when executed by one or more processors of the machine 500 (e.g., processor 502), cause the machine 500 to perform any one or more of the methodologies described herein, in whole or in part. Accordingly, a "machine-readable medium" refers to a single storage apparatus or device 120 or 130, as well as cloud-based storage systems or storage networks that include multiple storage apparatus or devices 120 or 130. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 522 is non-transitory in that it does not embody a propagating signal. However, labeling the tangible machine-readable medium 522 as "non-transitory" should not be construed to mean that the medium is incapable of movement; the medium should be considered as being transportable from one physical location to another. Additionally, since the machine-readable medium 522 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 522 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 502 or a group of processors 502) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 502 or other programmable processor 502. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 508) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 502 that are temporarily configured (e.g., by software) or permanently configured to perform the relevant operations. Whether temporarily or permanently configured, such processors 502 may constitute processor-implemented modules that operate to perform one or more operations or functions described herein. As used herein, "processor-implemented module" refers to a hardware module implemented using one or more processors 502.

Similarly, the methods described herein may be at least partially processor-implemented, a processor 502 being an example of hardware. For example, at least some of the operations of a method may be performed by one or more processors 502 or processor-implemented modules. As used herein, "processor-implemented module" refers to a hardware module in which the hardware includes one or more processors 502. Moreover, the one or more processors 502 may also operate to support performance of the relevant operations in a "cloud computing" environment or as a "software as a service" (SaaS). For example, at least some of the operations may be performed by a group of computers (as examples of machines 500 including processors 502), with these operations being accessible via a network 526 (e.g., the Internet) and via one or more appropriate interfaces (e.g., an API).

The performance of certain operations may be distributed among the one or more processors 502, not only residing within a single machine 500, but deployed across a number of machines 500. In some example embodiments, the one or more processors 502 or processor-implemented modules may be located in a single geographic location (e.g., within a home environment, an office environment, or a server farm). In other example embodiments, the one or more processors 502 or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine 500 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A method of a network protocol for generating cryptocurrency in a network of computerized nodes based in distributed ledger technology, the network protocol method comprising:
   transmitting, by a commissioning node, a request to perform calculations, the request to perform the calculations comprising an indication to remit an amount of cryptocurrency upon completion of the calculations;
   receiving, by a distributing node, the request to perform the calculations;
   transmitting, by the distributing node, to a plurality of work nodes, the request to perform the calculations;
   for each of the plurality of work nodes:
      receiving the request to perform the calculations;
      determining whether said work node of the plurality of work nodes is allowed to perform the calculations;
      determining whether said work node of the plurality of work nodes has computing resources sufficient to execute the request to perform the calculations, the sufficient resources comprising at least one of having enough expected memory and having enough estimated processing power; and
      transmitting a readiness reply to the distributing node;
   transmitting, by the distributing node, to the commissioning node, each of the readiness replies associated with each of the plurality of work nodes;
   transmitting, by the commissioning node, to the distributing node, and in response to the readiness replies, a work order associated with the request to perform the calculations, the work order comprising:
      instructions on how to perform the calculations, and
      data that the calculations are to be performed on;
   subdividing, by the distributing node, the work order into a plurality of calculation chunks;
   transmitting, by the distributing node, to each of the plurality of work nodes indicating a readiness to perform the calculations, one of the plurality of calculation chunks;
   for each of the plurality of work nodes receiving one of the plurality of calculation chunks:
      conducting calculations on the data in accordance with the instructions on how to perform the calculations;
      generating a calculation result; and
      transmitting, the calculation result to the distributing node;
   transmitting, by the distributing node, to the commissioning node, each of the calculation results; and
   accepting the calculation results by the commissioning node;
   wherein after accepting the calculation results, each of the plurality of work nodes that transmitted the calculation results receives a fraction of cryptocurrency associated with the amount of cryptocurrency remitted by the commissioning node.

2. The method of claim 1, wherein the distributing node is chosen randomly and anonymously from the commissioning node, and each of the plurality of work nodes is chosen randomly and anonymously from the distributing node.

3. The method of claim 1, wherein the commissioning node does not know at least some of the identities of any of the plurality of work nodes at least until the request to perform the calculations is completed.

4. The method of claim 1, wherein at least some of the transmissions between the commissioning node, the distributing node, and the plurality of work nodes are recorded in a distributed blockchain ledger.

5. A method of a computerized distributing node adhering to a network protocol for causing cryptocurrency to be generated in a network of computerized nodes based in distributed ledger technology, the method comprising:
   receiving, from a commissioning node within the network, a request to perform calculations, the request to perform the calculations comprising an indication to remit an amount of cryptocurrency upon completion of the calculations;
   transmitting, to a plurality of work nodes within the network, the request to perform the calculations;
   receiving, from each of the plurality of work nodes, a readiness reply indicating whether said work node is allowed to perform the calculations and said work node has computing resources sufficient to execute the request to perform the calculations, the sufficient resources comprising at least one of having enough expected memory and having enough estimated processing power;

transmitting, to the commissioning node, each of the readiness replies associated with each of the plurality of work nodes;
receiving, from the commissioning node, and in response to the transmitted readiness replies, a work order associated with the request to perform the calculations, the work order comprising:
instructions on how to perform the calculations, and data that the calculations are to be performed on;
subdividing the work order into a plurality of calculation chunks;
transmitting, to each of the plurality of work nodes indicating a readiness to perform the calculations, one of the plurality of calculation chunks;
receiving, from each of the work nodes indicating the readiness to perform the calculations, a calculation result based on said work node conducting calculations on the data in accordance with the instructions on how to perform the calculations;
transmitting, to the commissioning node, each of the calculation results; and
receiving an indication that the calculation results have been accepted by the commissioning node;
wherein the distribution node receives a fraction of cryptocurrency associated with the amount of cryptocurrency remitted by the commissioning node after the calculation results have been accepted by the commissioning node.

6. The method of claim 5, wherein the distributing node is chosen randomly and anonymously from the commissioning node, and each of the plurality of work nodes is chosen randomly and anonymously from the distributing node.

7. The method of claim 5, wherein the commissioning node does not know at least some of the identities of any of the plurality of work nodes at least until the request to perform the calculations is completed.

8. The method of claim 5, wherein at least some of the transmissions between the commissioning node, the distributing node, and the plurality of work nodes are recorded in a distributed blockchain ledger.

9. The method of claim 5, further comprising:
comparing, by the distribution node, each of the calculation results received from each of the work nodes;
determining that at least one of the calculation results is different than another calculation result; and
initiating a triage process to reconcile the different calculation results.

10. The method of claim 9, further comprising:
determining that a calculation result was computed in error using the triage process; and
penalizing the work node that produced the errant calculation result by deducting an amount of cryptocurrency from the penalized work node.

11. The method of claim 5, wherein each of the commissioning node, the distribution node, and the work nodes comprise:
a routing table comprising address information to at least some other nodes in the network;
information to access a copy of a distributed blockchain ledger; and
a secured computational sandbox configured to partition off a finite amount of memory and processing power of a computer from other regions of the computer, such that data within the sandbox is not allowed to interact with the rest of the computer outside the sandbox.

12. The method of claim 5, wherein the distribution node is a first distribution node, and the method further comprises:

transmitting, by the first distribution node, to a second distribution node, the request to perform the calculations, wherein the second distribution node is configured to transmit the request to perform the calculations to a second plurality of work nodes that the first distribution node is not in direct communication with;
receiving, from the second distribution node, a second set of readiness replies from the second plurality of work nodes, indicating for each work node in the second plurality, whether said work node is allowed to perform the calculations and said work node has computing resources sufficient to execute the request to perform the calculations; and
transmitting, to the commissioning node, each of the second set of readiness replies associated with each of the second plurality of work nodes.

13. A method of a computerized commissioning node adhering to a network protocol for causing cryptocurrency to be generated in a network of computerized nodes based in distributed ledger technology, the method comprising:
transmitting, to a distribution node within the network, a request to perform calculations, the request to perform the calculations comprising an indication to remit an amount of cryptocurrency upon completion of the calculations;
receiving, from the distribution node, a plurality of readiness replies each associated with each of a plurality of work nodes, wherein each readiness reply indicates whether said associated work node is allowed to perform the calculations and said associated work node has computing resources sufficient to execute the request to perform the calculations, the sufficient resources comprising at least one of having enough expected memory and having enough estimated processing power;
transmitting, to the distribution node, and in response to the received readiness replies, a work order associated with the request to perform the calculations, the work order comprising:
instructions on how to perform the calculations, and data that the calculations are to be performed on;
receiving, from the distribution node, a plurality of calculation results from each of the work nodes that indicated a readiness to perform the calculations, wherein each of the calculation results are based on said work node conducting calculations on a calculation chunk the data subdivided by the distribution node in accordance with the instructions on how to perform the calculations;
determining whether the received calculation results are valid;
transmitting an acceptance that the calculation results are valid; and
remitting the amount of cryptocurrency in response to the valid calculation results.

14. The method of claim 13, wherein the distributing node is chosen randomly and anonymously from the commissioning node, and each of the plurality of work nodes is chosen randomly and anonymously from the distributing node.

15. The method of claim 13, wherein the commissioning node does not know at least some of the identities of any of the plurality of work nodes at least until the request to perform the calculations is completed.

16. The method of claim 13, wherein at least some of the transmissions between the commissioning node, the distributing node, and the plurality of work nodes are recorded in a distributed blockchain ledger.

17. The method of claim 13, further comprising:
comparing, by the commissioning node, each of the calculation results received from each of the work nodes;
determining that at least one of the calculation results is different than another calculation result; and
initiating a triage process to reconcile the different calculation results.

18. The method of claim 17, further comprising:
determining that a calculation result was computed in error using the triage process; and
penalizing the work node that produced the errant calculation result by deducting an amount of cryptocurrency from the penalized work node.

19. The method of claim 13, wherein each of the commissioning node, the distribution node, and the work nodes comprise:
   a routing table comprising address information to at least some other nodes in the network;
   information to access a copy of a distributed blockchain ledger; and
   a secured computational sandbox configured to partition off a finite amount of memory and processing power of a computer from other regions of the computer, such that data within the sandbox is not allowed to interact with the rest of the computer outside the sandbox.

20. The method of claim 13, wherein the distribution node is a first distribution node, and wherein:
   the first distribution node transmits, to a second distribution node, the request to perform the calculations, wherein the second distribution node is configured to transmit the request to perform the calculations to a second plurality of work nodes that the first distribution node is not in direct communication with;
   the first distribution node receives, from the second distribution node, a second set of readiness replies from the second plurality of work nodes, indicating for each work node in the second plurality, whether said work node is allowed to perform the calculations and said work node has computing resources sufficient to execute the request to perform the calculations; and
   the commissioning node receives each of the second set of readiness replies associated with each of the second plurality of work nodes.

\* \* \* \* \*